US005810597A

United States Patent [19]

Allen, Jr. et al.

[11] Patent Number: 5,810,597

[45] Date of Patent: Sep. 22, 1998

[54] TOUCH ACTIVATED AUDIO SIGN

[75] Inventors: Robert H. Allen, Jr., 915 Benfield Dr., Greensboro, N.C. 27410; Frank Lapietra, Hopewell Junction, N.Y.

[73] Assignee: Robert H. Allen, Jr.

[21] Appl. No.: 667,390

[22] Filed: Jun. 21, 1996

[51] Int. Cl.$^{6}$ .............................. G09B 21/00; G09F 7/00

[52] U.S. Cl. .......................... 434/112; 434/113; 434/116; 40/584; 40/596; 40/906

[58] Field of Search .............................. 40/124.03, 124.5, 40/717, 455, 906, 584, 585, 596; D11/132; 434/112, 113, 114, 116

[56] References Cited

U.S. PATENT DOCUMENTS

| | | | |
|---|---|---|---|
| 4,404,764 | 9/1983 | Wills et al. | 40/124.1 |
| 5,063,698 | 11/1991 | Johnson et al. | 40/124.1 |
| 5,284,444 | 2/1994 | Raynes | 434/113 |
| 5,345,705 | 9/1994 | Lawrence | 40/616 |
| 5,387,108 | 2/1995 | Crowell | 434/319 |
| 5,412,189 | 5/1995 | Cragun | 235/379 |
| 5,438,781 | 8/1995 | Landmann | 40/584 |
| 5,536,170 | 7/1996 | Murphy | 434/113 |
| 5,551,877 | 9/1996 | Murphy | 434/113 |
| 5,608,979 | 3/1997 | Johnson | 40/491 |

OTHER PUBLICATIONS

Interiors & Directories, Custom Audio Sign Capability. Andco Industries Corp. Internet Web Page. SpyderByte Communications, Inc., 1994.

Acrontech Audible Signs, Acrontech Intl., Inc. Internet Web Page., Jul. 1997.

Lovelock, Christopher H, "What language shall we put it in?", Marketing Management, V3, No. 3 pp. 36–45+, Jan. 1994.

Head et al., "Audio device for the blind", IBM Technical Disclosure Bulletin V.21, No.9, Feb. 1979.

*Primary Examiner*—Robert A. Hafer
*Assistant Examiner*—John Edmund Rovnak
*Attorney, Agent, or Firm*—Rhodes, Coods & Bennett, L.L.P.

[57] ABSTRACT

The present invention is directed to an audio sign adapted to provide an aural message once the sign is tactilely actuated. The invention typically includes a graphical information section, a tactile information section, and a self contained audio section configured to provide aural information once tactilely actuated.

23 Claims, 3 Drawing Sheets

TOUCH ACTIVATED AUDIO SIGN

BACKGROUND OF THE INVENTION (1) Field of the Invention

The present invention relates generally to aiding the visually impaired and, more particularly, to a sign or a module associated with a sign for providing aural information to those unable to perceive graphical information displayed on the sign.

(2) Description of the Prior Art

Significant concern about providing accurate and pertinent information to the visually impaired in buildings and other structures has increased dramatically in recent years. Sensitivity to the needs and requirements of the visually impaired has lead to modifications and additions to society's environment to relieve the burdens placed upon these individuals. For example, most elevator control panels now include braille indicators to allow the visually impaired to determine the location and function of the buttons on the panel. Many door and hallway signs are required to include braille indicators to provide corresponding information. Many of the above-mentioned modifications are required by the new American Disability Act which requires braille indicators in and around many public areas. However, signage including braille or other tactile indicators often cannot provide the relevant information as clearly and succinctly as the information provided graphically. Furthermore, the visually impaired may require additional information which is generally not displayed graphically and difficult to provide tactilely. Such information may provide identification, direction and warning relating to various rooms, hallways or the like.

As noted above, tactile information is provided throughout public areas to help facilitate the visually impaired. Recent advances in the aid of the visually impaired include some mechanisms which provide aural information to the visually impaired. U.S. Pat. No. 5,417,574, issued to Raynes, discloses a handrail system for providing audio messages to the visually impaired. Raynes discloses the use of a system of handrails extending throughout a building with tactile information in the form of braille messages imprinted on the inside of the handrail to give identification, direction and warning to the handrail user. The handrail may also include an audio message means operable by the pressing of a button by a visually impaired person. Although apparently helpful in aiding a visually impaired person navigate a building, wide use of the handrail system is impractical. Further, the system of Raynes does not provide visual or graphic information and is, therefore, of no use to sighted persons.

Currently, handrail systems are not typically used in buildings and are certainly not convenient to install in a continuous manner to provide meaningful and consistent information to the visually impaired user. Providing all public places with the Raynes handrail system would also be very expensive. Furthermore, visually impaired persons typically like to remain relatively inconspicuous, and considered equal with their peers. In short, the visually impaired do not want to appear different from those having sight.

Other advances in the art have included signs capable of providing an audible message when a remote transmitter provides the sign with a signal. Certain transit authorities are using audible signs to provide warning and other information to the visually impaired equipped with a corresponding remote transmitter. These remote activated audio signs have not received a warm welcome from the visually impaired community. Carrying the remote transmitters and activating the audio signs often attracts unwanted attention to the user. Furthermore, these remote signs would be extremely hard to adapt to building, room, elevator and corridor use given the close proximity of sign locations. Providing such a system for a public building would be a logistical nightmare. How would one determine which sign should be activated? Providing everyone with a sophisticated transmitter capable of distinguishing and activating only selected signs would be difficult to implement and extremely uneconomical.

Thus, there remains a need for a new audio sign configured to actuate an audio message having aural information when the sign is tactilely activated. An audio sign is needed to provide information relating to and supplementing graphical information displayed thereon. Tactilely actuating the sign would decrease the amount of attention drawn to the user while providing a feasible and cost effective audio sign for public buildings. Furthermore, there is a need for a self contained, battery powered audio sign capable of being tactilely actuated, which is easily retrofitted in place of or in supplement to existing signs.

SUMMARY OF THE INVENTION

The present invention is directed to an audio sign adapted to provide an aural message once the sign is tactilely actuated. The invention typically includes a graphical information section, a tactile information section, and an audio section configured to provide aural information once tactilely actuated. Preferably, the invention is self contained by being battery powered and so configured as to provide an economical audio sign which is user friendly to the visually impaired, in addition to the remaining public. The sign is economical in that existing buildings may be retrofitted easily without having to provide alternative power supplies to each existing sign location. Furthermore, the present invention overcomes the limitations associated with remote transmitter actuated signs and provides the ability to give the visually impaired specific information relating to a specific sign and sign location.

Accordingly, one aspect of the present invention is to provide an audible sign for visually impaired persons having a sign adapted to provide visual information and tactile information; audio circuitry associated with the sign and adapted to store and recover aural information; a speaker operatively associated with the audio circuitry for providing audible play of the aural information; and an actuator operatively coupled to the audio circuitry and positioned on the sign. The actuator is adapted to actuate playback of the aural information when touched. The sign, when provided with the visual information, tactile information and aural information, provides information to those with and without visual impairments by viewing the sign, tactilely reading the sign or listening to the sign after touching the actuator. The aural information may include information in addition to the tactile or visual information to provide further assistance to the visually impaired.

The audio circuitry may include a self contained power supply adapted to operate from a battery. The audio circuitry may include an amplifier adapted to amplify the audible play of the aural information. The sign may include a surface having braille to provide the tactile information, graphics to provide the visual information and a stored aural message to provide the aural information. Typically, the aural information corresponds to the tactile information and the visual information on the sign.

The audio circuitry will generally include a memory for storing the aural information. Certain applications will use a one-time programmable memory. When the aural information changes, the memory of audio section will have to be replaced. When integrated "touch audio chips" are used, the entire audio chip will be replaced. "Audio chips" include dedicated audio circuitry on an integrated circuit for providing substantially all audio storage and recovery functions. "Touch audio chips" may further incorporate an actuator on the integrated circuit to trigger playback of the store aural information. The tactile information may be provided on the actuator. Playback of the aural information will occur when the tactile information on the actuator is touched.

Other applications may use memory capable of being erased and programmed multiple times. Furthermore, the memory may be preprogrammed to include the aural information. In other words, the memory is programmed prior to installation and often prior to assembly of the sign. In most applications, the audio circuitry is adapted to store and recover the aural information digitally prior to playback.

The audio circuitry may include a microphone, recorder and memory operatively associated together. The recorder is adapted to record an audible message representing the aural information received by the microphone and store the aural information in the memory without replacing memory components.

Another aspect of the present invention is to provide an information device to be associated with a sign adapted to provide visual information for assisting visually impaired persons. The device includes audio circuitry adapted to store and recover aural information; a speaker operatively associated with the audio circuitry for providing audible play of the aural information; an actuator operatively coupled to the audio circuitry and adapted to actuate playback of the aural information when touched; and may include a tactile information surface for providing tactile information. When the information device is placed proximately to a sign provided with visual information, the tactile information and the aural information provide information to those with visual impairments by tactilely reading the sign or listening to the sign after touching the actuator. The tactile information on the tactile information surface may be provided in braille. The tactile information surface may be placed on the actuator, which is adapted to actuate the playback of the aural information when the tactile information surface is touched. The aural information programmed into the audio circuitry may include information relating to: number, location, function, direction, warning, advertising, instruction, date, time or any other pertinent information.

The audio circuitry generally includes a memory for storing the aural information. The memory may be one-time programmable memory or configured to be erased and reprogrammed repeatedly. The memory may be preprogrammed to include the aural information. Typically, the audio circuitry is adapted to store and recover the aural information digitally prior to playback. Certain embodiments may include a microphone, recorder and memory operatively associated together. The recorder being adapted to record an audible message representing aural information received by the microphone and store the aural information in the memory.

Preferably, the audio circuit includes dedicated audio circuitry on an integrated circuit, or "audio chip," for providing substantially all audio storage and recovery functions. The "audio chip" may be touch activated wherein the actuator is incorporated on the integrated circuit.

Yet another aspect of the present invention is to provide an audible sign for visually impaired persons including: a sign adapted to provide visual information; a tactile information surface for providing tactile information in braille; audio circuitry having a memory associated with the sign and adapted to digitally store and recover aural information for playback; a speaker operatively associated with the audio circuitry for providing audible play of the aural information; and an actuator having the tactile information surface thereon operatively associated with the audio circuitry and positioned on the sign. The actuator is adapted to actuate playback of the aural information when touched. When provided with visual information, tactile information and aural information, the sign provides information to those with and without visual impairments by viewing the sign, tactilely reading the braille or listening to the sign after touching the actuator.

Still another aspect of the present invention is to provide a method of providing information via a sign to persons with and without visual impairments. The method includes the steps of providing a sign with visual information and tactile information; providing audio circuitry associated with the sign adapted to play an audible message associated with the visual and tactile information when actuated; and playing the audible message when the audio circuitry is actuated.

These and other aspects of the present invention will become apparent to those skilled in the art after a reading of the following description of the preferred embodiments when considered with the drawings.

DESCRIPTION OF THE PREFERRED EMBODIMENTS

Figure 2:
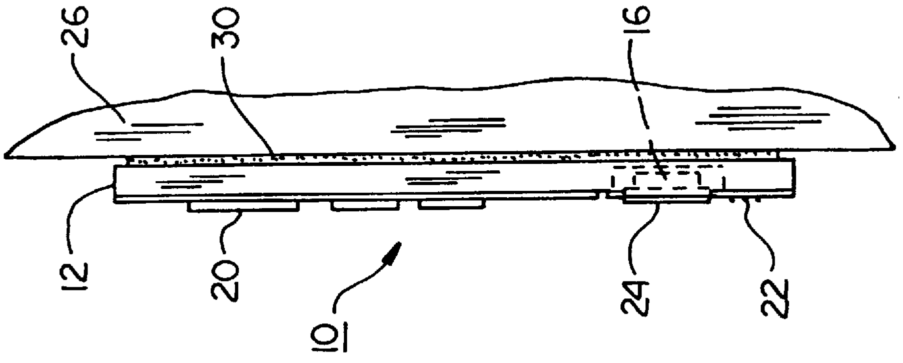
FIG. 2 is a side view of the touch audio sign of FIG. 1.

In the following description, like reference characters designate like or corresponding parts throughout the several views. Referring now to the drawings in general, and FIG. 1 in particular, it will be understood that the illustrations are for the purpose of describing preferred embodiments of the invention and are not intended to limit the invention thereto.

Figure 1:
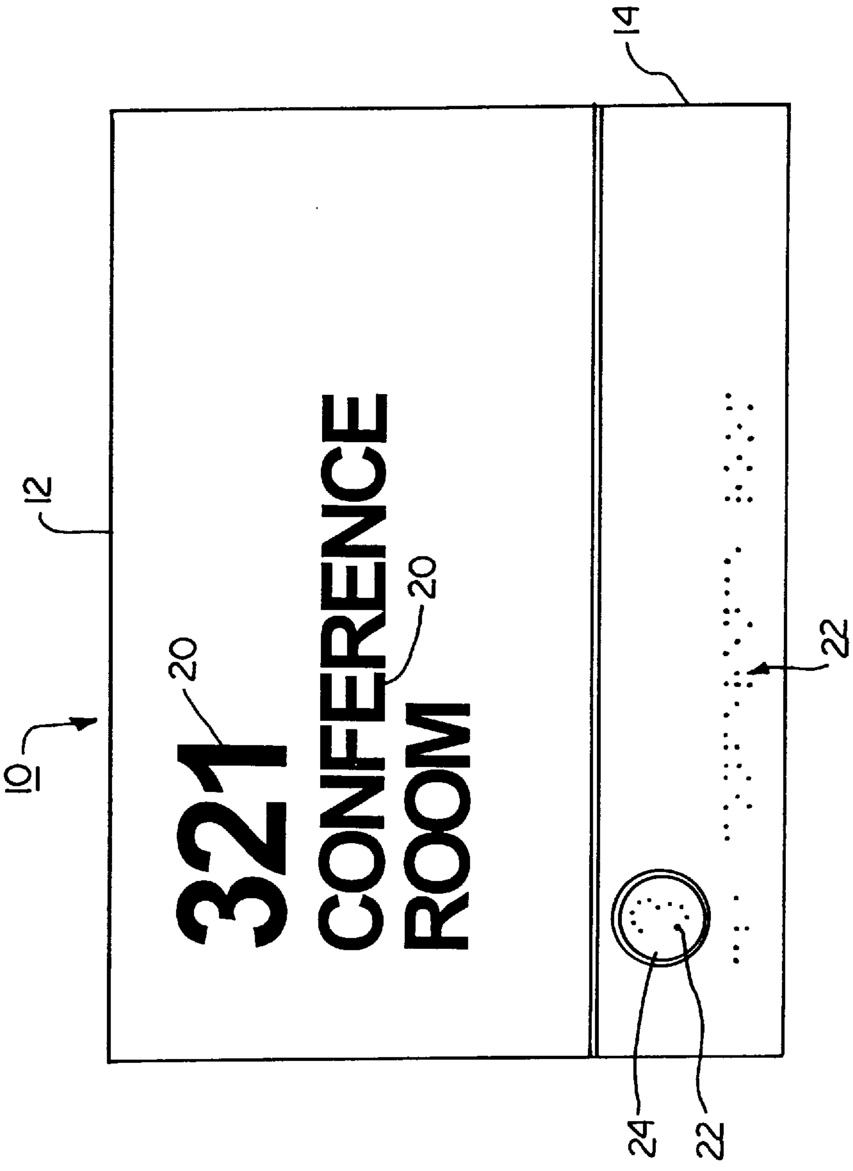
FIG. 1 is a front view of a touch audio sign constructed according to the present invention for providing visual, tactile and aural information.

As best seen in FIG. 1, a touch audio sign, generally designated 10, is shown constructed according to the present invention. The touch audio sign 10 includes three primary sub-assemblies: a visual sign section 12, a tactile sign section 14, and an audio section 16 (shown in FIG. 2). The visual sign section 12 typically includes graphical information 20 to visually provide information. The graphical information 20 may include any number or combination of letters, numbers and symbols necessary to provide the information desired. The touch audio sign 10 shown in FIG. 1 is a sign indicating a room number ("321") and the function or title of the room ("Conference Room"). The graphical information may include any type of information desired to be displayed on a sign.

The tactile sign section 14 provides tactile information 22 to visually impaired persons. Visually impaired persons are able to touch the tactile information 22 and determine the information symbolized therein. Often the tactile information 22 is arranged in braille form. Braille is a system of writing for the visually impaired that uses characters made up of raised dots. The information "321 Conference Room" is represented by the series of braille characters along the bottom of the tactile sign section. In certain circumstances, the tactile information 22 of the tactile sign section 14 may provide information in addition to the information visually provided in the graphical information 20 of the visual sign section 12.

Aural information is provided upon the touch of an actuator 24. The actuator 24, which may be any type of closable switch contact, button, keypad or electronic switch is used to activate the audio section 16. The actuator 24 may also include tactile information 22. As with any of the tactile information 22, the information may be provided in a braille or non-braille format. Alternatively, the actuator 24 may be provided without any tactile information 22.

As shown in FIG. 2, the audio section 16 and the actuator 24 are preferably closely oriented and tightly packaged to provide a thin, non-intrusive package, which is easily integrated in either the tactile sign section 14, the visual sign section 12, or in a separate stand-alone package capable of being associated with a pre-existing sign. All of the electronics necessary for the aural message may be contained easily within the configuration of a relatively thin sign (½" thick by way of example).

As indicated above, once the actuator 24 is touched, pressed or otherwise activated, the audio section 16 provides aural information in the form of an audible message. The aural information may simply include the information provided in the graphical information 20 or the tactile information 22. Alternatively, the aural information may provide supplemental information in addition to any information otherwise provided in the visual sign section 12 or tactile sign section 14. For example, the aural information may include information specifically directed towards the needs of the visually impaired, such as pointing out directions, obstacles or warnings otherwise imperceptible to those without sight. Those skilled in the needs of visually impaired persons will quickly recognize the tremendous information providing capabilities of the present invention, and such capabilities are considered within the scope of the accompanying claims.

The touch audio sign 10 is easily adapted to any environment requiring the dissemination of information to those with and without visual impairments without the associated electronic transmitters and receivers of the prior art. The audio section 16 and associated electronics are discussed below in further detail.

The touch audio sign 10 is easily adapted for placement on a variety of walls as an original sign, a replacement sign or a supplement to an existing sign already including a visual sign section 12 with graphical information 20. The touch audio sign 10 is preferably mounted to a wall or other surface with double-sided vinyl tape 30. However, any suitable mounting technique such as brackets, screws, glues or hangers are acceptable.

Figure 4:
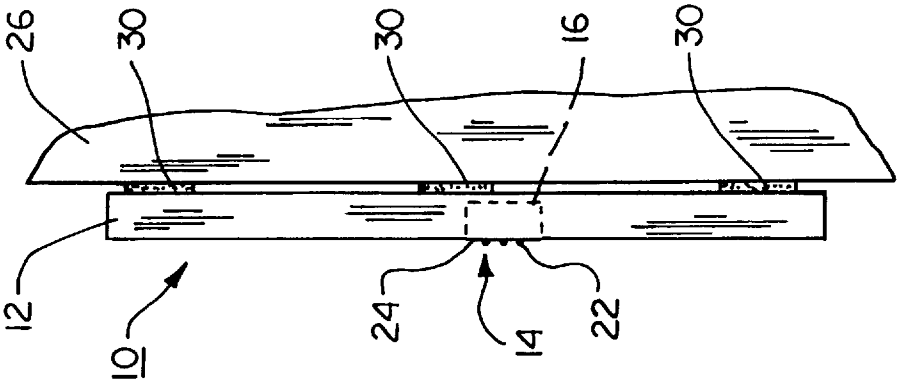
FIG. 4 is a side view of the touch audio sign of FIG. 3.
Figure 3:
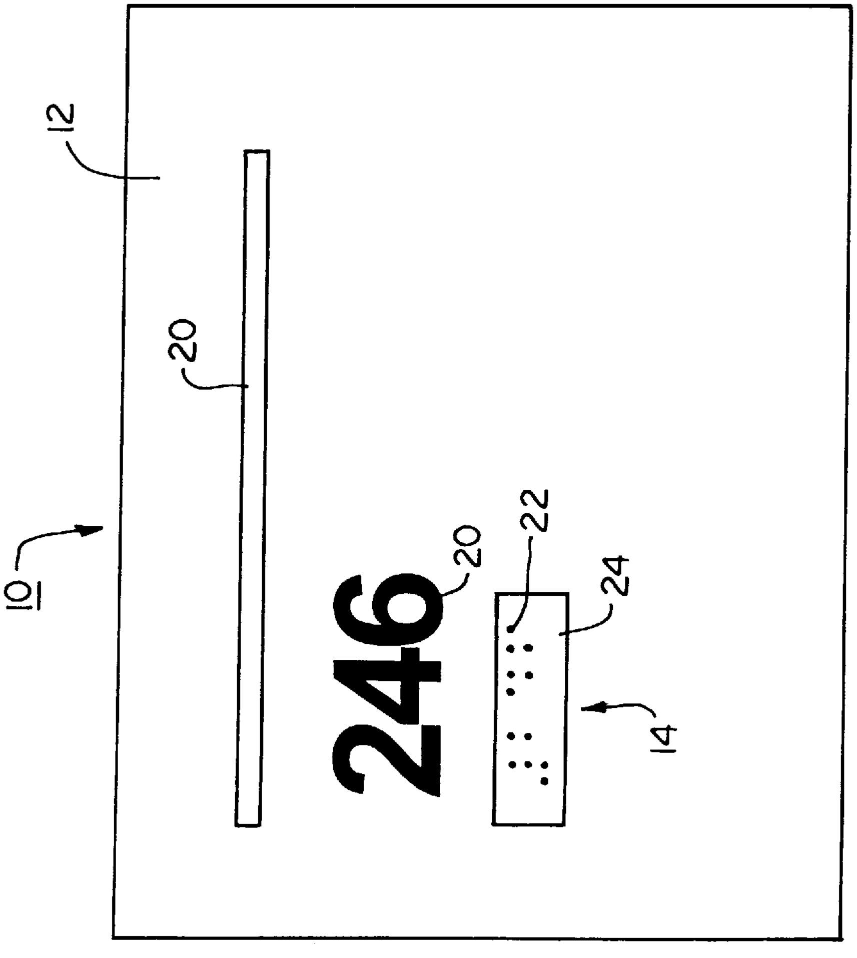
FIG. 3 is a front view of a touch audio sign constructed according to the present invention for providing visual, tactile and aural information.

Turning now to FIGS. 3 and 4, another embodiment of the touch audio sign 10 is shown. In this embodiment, the actuator 24 includes the entire tactile sign section 14 and all of the tactile information 22. Additional tactile information 22 may be provided on the visual sign section 12 in addition to the graphical information 20. Providing the tactile sign section 14 on the actuator 24 may automatically activate the audio section 16 (shown in FIG. 4) to audibly provide selected information. The embodiment shown in FIGS. 3 and 4 clearly shows the tremendous potential in designing and arranging the graphical information 20, the tactile information 22 and the aural information provided by the audio section 16 in a variety of user friendly and aesthetically pleasing embodiments. Furthermore, the tactile sign section 14 in either of the embodiments shown in FIGS. 2 and 3 may be provided in a separate module and associated with separate or pre-existing signs to provide further flexibility in arranging and retrofitting the module in or with existing signs providing graphical information.

Figure 5:
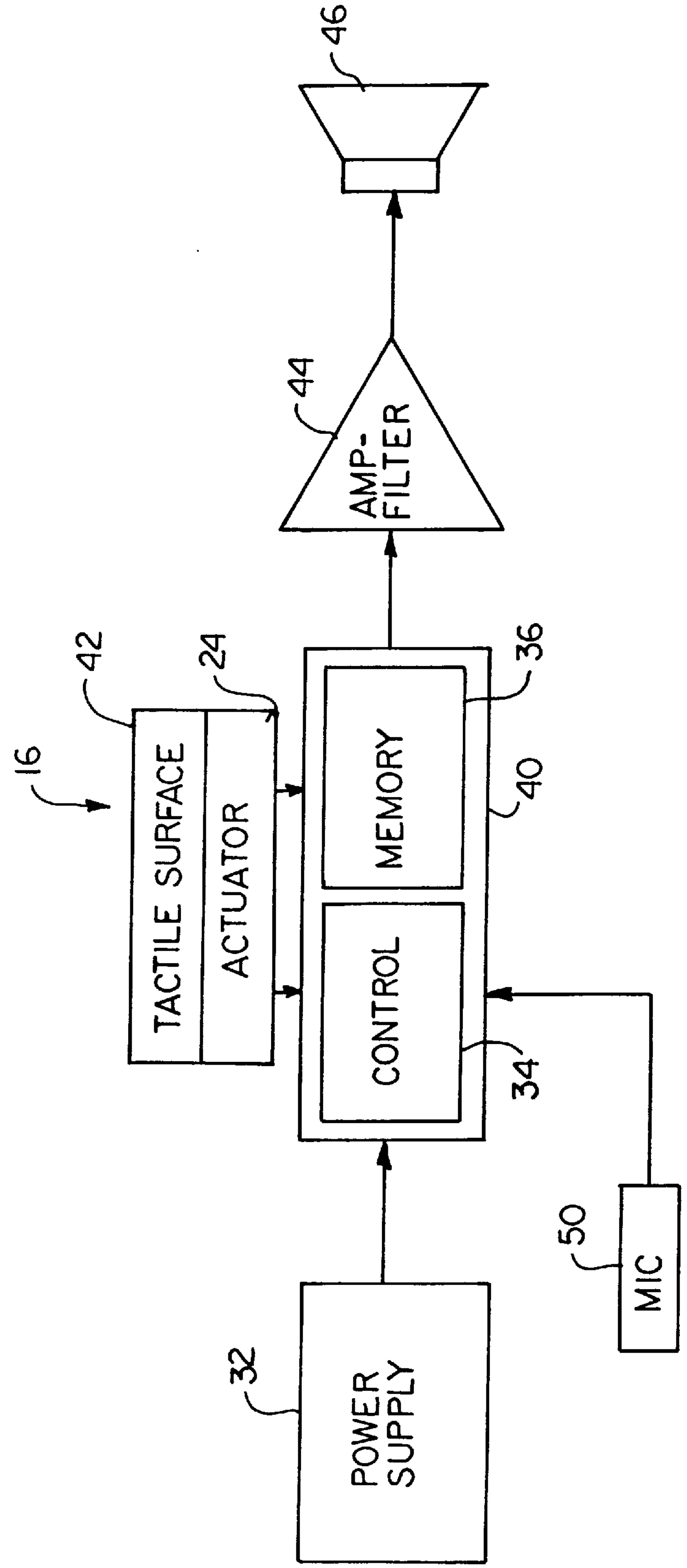
FIG. 5 is a schematic of an audio section for use in a touch audio sign constructed according to the present invention.

As best seen in FIG. 5, the audio section 16 basically requires a power supply 32, control circuitry 34, memory circuitry 36 associated with the control circuitry 34, an audio amplifier 44, a speaker 46 for transforming the output of the amplifier 44 into an audible output, and an actuator operatively associated with the control circuitry 34 to initiate playback of an audio message having the aural information. Typically, when the actuator 24 is touched or pressed, the control circuitry 34 starts playback of the recorded message. The message is amplified and played through speaker 46. Preferably, the control circuitry 34 and the memory circuitry 36 operate in conjunction and are adapted to store a digital representation of the message. When the actuator 24 is activated, the digital representation of the message is transformed into an analog signal for amplification. A filter is often associated with the amplifier 44 to filter out various noise and unwanted components associated with the digital to analog transformation.

Preferably, the design of the touch audio sign will produce high quality audio. Existing integrated circuit (IC) technology available today is capable of providing good audio quality in a small package. Certain manufacturers produce self-contained audio playback integrated circuits with a built-in memory. Most of these packages are quite small and only require external filtering and amplification. Other products are likely to become available which include the filtering and amplification and quite possibly an acoustic transducer or speaker. OKI Semiconductor Corporation provides an MSM6378A IC suitable for use with the present invention. Other non-dedicated circuitry is also available and capable of design by those skilled in the art after reviewing the disclosure herein. Furthermore, certain self-contained audio IC's are touch activated and, therefore, incorporate the actuator 24 thereon. A surface film may be applied to the actuator to provide a tactile surface 42 providing tactile information 22.

Although the preferred embodiments are directed toward digital storage and recovery, purely analog systems, such as those incorporating tape and tape recorders, are possible. These and similar systems will be recognized by skilled artisans as equivalents to the above digital embodiments.

Of primary importance in touch audio sign applications is power consumption and memory requirements. Preferably, the power supply 32 is a battery. Although other power sources may work and are acceptable, the use of a battery provides additional flexibility in providing signs in places in which other power sources do not exist. Thus, the touch audio sign is preferably designed to minimize power consumption. Preferably, the power supply 32 is four 3 volt, type AAA alkaline batteries.

The amount of aural information stored in memory is determined by the quality of audio playback desired and the amount of memory available. Preferably, memory will be used at a rate not less than 4 kilobytes per second. Playback rates at or above 4 kilobytes per second will provide sufficient audio playback quality. Preferably, the touch audio sign will utilize the industry standard ADPCM (adaptive differential pulse code modulation) compression technique at an 8 kilohertz sampling rate. Using an 8 kilohertz sampling rate will provide audible frequencies up to 4 kilohertz with little or no distortion. The range of a typical human voice providing information is typically below 4 kilohertz.

As noted, the amount of memory required in the touch audio sign is determined by the desired audio quality and length of message. The memory circuitry 36 is programmable. Depending on the application, the memory may be programmed prior to assembly of the audio circuitry 16 or programmed anytime thereafter. The present invention will often require that each audio sign provide different aural information. Thus, the memory circuitry 36 may be configured to be one time programmable or configured to be erased and reprogrammed with different aural information. The touch audio sign's aural information may be changed by completely swapping out the integrated audio IC 36, replacing the memory component of the memory circuitry 36, or reprogramming the memory circuitry 36.

Optionally, the audio section 16 may be configured to record a new message without removing part of the memory circuitry 36. A microphone 50 may be used to provide new aural information to the control circuitry 34. In such an embodiment, the control circuitry 34 would receive and store the new aural information in the memory circuitry 36. The control circuitry 34 may require an analog to digital converter to facilitate storing the original analog information in a digital format.

Certain modifications and improvements will occur to those skilled in the art upon a reading of the foregoing description. It should be understood that all such modifications and improvements have been deleted herein for the sake of conciseness and readability but are properly within the scope of the following claims.

I claim:

1. A wall mountable, touch activated audible sign for visually impaired persons comprising:

a sign panel having a first surface with permanently formed visual information and tactile information designed to be perceptible by visually impaired persons and a second surface opposite said first surface for mounting to a wall in a building;

audio storage and playback circuitry attached to said sign panel and adapted to play aural information stored in said audio storage circuitry, said aural information relating to said visual and tactile information;

a speaker operatively associated with said audio storage and playback circuitry for providing audible play of said aural information; and an actuator operatively coupled to said audio storage and playback circuitry, said actuator initiating playback of said aural information when touched;

wherein said visual information, said tactile information and said aural information relate to an area in the building to provide information to those with and without visual impairments upon viewing said sign panel, tactilely reading said sign panel or listening to said aural information after touching said actuator.

2. The apparatus according to claim 1 wherein said audio storage and playback circuitry includes a power supply and electrical energy is provided from a battery.

3. The apparatus according to claim 1 wherein said audio storage and playback circuitry includes an amplifier to amplify said audible play of said aural information.

4. The apparatus according to claim 1 wherein said panel includes a surface having braille to provide said tactile information.

5. The apparatus according to claim 1 wherein said panel includes graphics to provide said visual information.

6. The apparatus according to claim 1 wherein said audio storage and playback circuitry includes a stored aural message to provide said aural information.

7. The apparatus according to claim 6 wherein said aural information corresponds to said tactile information and said visual information on said sign.

8. The apparatus according to claim 1 wherein the audio storage and playback circuitry includes a memory for storing said aural information.

9. The apparatus according to claim 8 wherein said memory is a one-time programmable memory.

10. The apparatus according to claim 8 wherein said memory is reprogrammable.

11. The apparatus according to claim 8 wherein said memory is preprogrammed to include said aural information.

12. The apparatus according to claim 1 wherein said audio storage and playback circuitry stores and recovers said aural information digitally prior to playback.

13. The apparatus according to claim 1 wherein said audio storage and playback circuitry includes a microphone, recorder and memory operatively associated together, said recorder adapted to record an audible message representing said aural information received by said microphone and store said aural information in said memory.

14. The apparatus according to claim 1 wherein said audio storage and playback circuitry includes dedicated audio storage and playback circuitry on an integrated circuit for providing substantially all audio storage and recovery functions.

15. The apparatus according to claim 14 wherein said integrated circuit is touch activated and said actuator is incorporated on said integrated circuit.

16. The apparatus according to claim 1 wherein said tactile information is provided on said actuator, said actuator initiating playback of said aural information when said tactile information on said actuator is touched.

17. The apparatus according to claim 1 wherein said tactile information is provided on said actuator.

18. The apparatus according to claim 1 wherein said aural information includes information in addition to said tactile or visual information.

19. The apparatus according to claim 1 wherein additional tactile information is provided on said actuator.

20. A wall mountable, touch activated audible sign for visually impaired persons comprising:

a wall mountable sign panel having permanently formed visual information on a surface opposite an opposing surface to be mounted adjacent a wall of a building, said visual information relating to an area in the building;

a tactile information surface having braille indicators thereon providing information relating to the area in the building and the visual information;

audio storage and playback circuitry having a memory and attached to said sign panel and configured to digitally store and recover aural information for playback, said aural information relating to the tactile and visual information;

a speaker operatively associated with said audio storage and playback circuitry for providing audible play of said aural information; and an actuator operatively associated with said audio storage and playback circuitry and positioned on said sign, said actuator initiating playback of said aural information when touched, said aural information relating to said visual information;

wherein the visual information, the tactile information, and the aural information provide information to those with and without visual impairments upon viewing the sign, tactilely reading said braille or listening to the sign after touching said actuator.

21. A touch activated building sign for the visually impaired comprising:

a) a panel having a first surface with visual information and a second surface for mounting on a wall in a building, said visual information providing information relating to an area associated with the building;

b) audio circuitry electrically coupled to an actuator requiring physical contact for actuation, adapted to play aural information relating to the visual information relating to the area associated with the building when said actuator is actuated by physical contact, and mounted adjacent said panel to provide a building sign; and c) tactile information positioned on a surface of said building sign accessible to the visually impaired when said building sign is mounted on the wall in the building, said tactile information configured to be readily perceptible to visually impaired persons and relating to the area associated with the building.

22. The touch activated building sign of claim 21 wherein said information relating to an area associated with the building identifies the area.

23. The touch activated building sign of claim 21 wherein said information relating to an area associated with the building provides information about the area.

* * * * *